United States Patent Office 3,468,913
Patented Sept. 23, 1969

3,468,913
8-CHROMANYL-CARBAMATE ESTERS
William G. Scharpf, Rocktown, N.J., assignor to FMC Corporation, New York, N.Y., a corporation of Delaware
No Drawing. Continuation-in-part of application Ser. No. 472,335, July 15, 1965. This application June 9, 1966, Ser. No. 556,259
Int. Cl. C07d 7/20; A01n 9/20
U.S. Cl. 260—345.2                                7 Claims

ABSTRACT OF THE DISCLOSURE

A new class of pesticides, useful for the control of Arthropoda and Nematoda, comprises 8-chromanyl carbamate esters of the formula

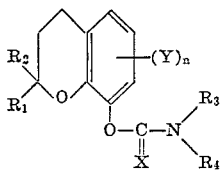

wherein $R_1$, $R_2$, $R_3$, and $R_4$ are each hydrogen or a lower aliphatic group; Y is hydrogen or one of a variety of groups e.g. chloro or lower alkyl; $n$ is an integer of 1 to 3; and X is oxygen or sulfur. Synthesis of representative compounds of this class, their physical properties, and their effectiveness against insects and nematodes are described.

---

This application is a continuation-in-part of copending application Ser. No. 472,335, filed July 15, 1965, now abandoned.

This invention relates to new chemical compounds and their preparation, to pesticidal compositions containing these new compounds, and to the use of said compositions to control Arthropoda and Nematoda. More particularly, this invention relates to certain 8-chromanyl estesr of carbamic acids, as novel and effective pesticides.

The compounds of this invention, and their numbering system, are represented by the structural formula:

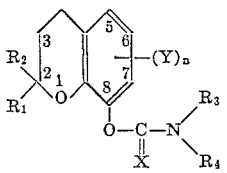

where $R_1$ and $R_2$ are each hydrogen or aliphatic groups of one to about three carbon atoms including alkyl and alkenyl groups; $R_3$ and $R_4$ are each hydrogen or aliphatic groups of one to about three carbon atoms, including alkyl, alkenyl, and alkynyl groups; and X is oxygen or sulfur. These compounds may be unsubstituted in the benzene ring, or may contain one or more substituents Y in the benzene ring as shown, where $n$ is an integer of 1 to 3, which substituents Y may be the same or different and may be lower aliphatic groups, including alkyl and alkenyl groups, halogen, haloalkyl, nitro, amino and substituted amino, cyano, alkoxycarbonyl, acyl, alkylmercapto, alkoxy, other carbamate groups, and the like.

Compounds of the above-defined class exhibit outstanding pesticidal activity, including effective activity against Arthropoda such as Coleoptera (beetles), Hemiptera (true bugs), Homoptera (aphids), Acarina (mites), Diptera (flies and wasps), Blattaria (roaches), and Lepidoptera (moths and butterflies). In addition, several of the compounds of this class are particularly effective in the control of Nematoda.

Certain preferred compounds of this invention include compounds of the general formula:

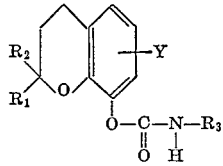

wherein $R_1$ and $R_2$ are each hydrogen or methyl, $R_3$ is hydrogen or a saturated or unsaturated aliphatic hydrocarbon group of one to three carbon atoms, and Y represents monosubstitution in the 5- or 6-position and may be hydrogen, chlorine, or lower alkyl.

The preparation and pesticidal activity of typical compounds of this invention are illustrated in the following specific examples, which are provided by way of illustration and not of limitation. All temperatures are in degrees centigrade.

Example 1.—Preparation of 2,2-dimethyl-8-chromanyl methylcarbamate 2,2-dimethyl-8-chromanol, prepared as described by Hallet and Huls, Bull. Soc. Chim. Belg. 61, 33–43 (1952), was reacted with methyl isocyanate as follows: 0.5 g. of methyl isocyanate was added to a solution of 1.0 g. of 2,2-dimethyl-8-chromanol and two drops of triethylamine in 10 ml. of ether. The mixture was refluxed for twenty-four hours, cooled and filtered. The white crystals were washed with ether and with pentane to yield 0.9 g. of 2,2-dimethyl-8-chromanyl methylcarbamate, melting at 147°.

*Analysis.*—Calculated for $C_{13}H_{17}NO_3$: C, 66.36; H, 7.28; N, 5.96. Found: C, 66.28; H, 7.26; N, 6.21.

This compound may also be prepared by other methods. For example, many methods of preparation of carbamic acid esters are described by Wagner and Zook, "Synthetic Organic Chemistry," Chp. 23, John Wiley and Sons, New York, 1953. The intermediate 2,2-dimethyl-8-chromanol may also be prepared by alternate routes, such as that described by Hallet and Huls, op. cit., for the preparation of 2,2-dimethyl chroman.

The insecticidal and nematocidal activity of 2,2-dimethyl-8-chromanyl methylcarbamate is of a high order, as illustrated in Examples 2–4 below, which demonstrate pesticidal activity under a variety of conditions, for representative pests.

Example 2.—Insecticidal activity

Insecticidal activity including acaricidal activity was measured as follows: The compound 2,2-dimethyl-8-chromanyl methylcarbamate (0.5 g.) was dissolved in 40 ml. acetone and this solution was dispersed in 360 ml. of water containing one drop of Triton X–100, a surfactant identified as isooctyl phenyl polyethoxy ethanol; aliquots of this solution were diluted with water to provide solutions containing 1250, 312, 78, and 20 p.p.m. of active ingredient. Test insects and techniques were as follows: The activities against the Mexican bean beetle (*Epillachna varivestis* Muls.) and the southern armyworm (*Prodenia eridania* [Cram.]) were evaluated by dipping the leaves of pinto bean plants into the test solutions and infesting the leaves with the larvae of the insects when the foliage had dried; the activity against the two-spotted spider mite (*Tetranychus telarius* [L.]) was evaluated on pinto bean plants whose leaves were dipped after infestation with adult mites; the activity against the pea aphid (*Macrosiphum pisi* [Harris]) was evaluated on broad bean plants whose leaves were dipped before infestation with adult aphids; and the activities against the milkweed bug (*Oncopeltus fascinatus*

[Dallas]) and the plum curculio (*Conotrachelus nenuphar* [Herbst]) were evaluated by spraying the test solutions into glass dishes containing the adult insects. All insects in the test were maintained in a holding room at 80° F. and 50% relative humidity for an exposure period of 48 hours. At this time the number of dead and living insects were counted and the percent kill was calculated. Results presented in Table 1 are an average of two replicates.

TABLE 1.—INSECTIDAL ACTIVITY OF 2,2-DIMETHYL-8-CHROMANYL METHYLCARBAMATE

| Test Insect | Percent kill at— | | | | |
|---|---|---|---|---|---|
| | 20 p.p.m. | 78 p.p.m. | 312 p.p.m. | 1,250 p.p.m. | Untreated |
| Mexican bean beetle | 100 | 100 | 100 | 100 | 0 |
| Southern armyworm | 10 | 65 | 70 | 100 | 0 |
| Two-spotted spider mite | | 90 | | 100 | 0 |
| Pea aphid | 100 | 100 | 100 | 100 | 0 |
| Milkweed bug | 100 | 100 | 100 | 100 | 15 |
| Plum curculio | 20 | 90 | 100 | 100 | 5 |

Example 3.—Systemic insecticidal activity

This compound also exhibits useful systemic insecticidal activity, illustrated as follows: The roots of small lima bean plants were excised, and the plants were placed in water for a period of at least three to four hours until they had recovered from the wilting caused by excision of the roots. The stems of these turgid plants were then inserted into aqueous solutions of 2,2-dimethyl-8-chromanyl methylcarbamate at concentrations of 78 and 20 p.p.m. active ingredient. Twenty-four hours after the plants were placed in the test solutions the leaves were infested with the test insects. The number of dead and living insects were counted forty-eight hours after infestation and the percent kill was calculated. Results presented in Table 2 below are an average of two replicates:

TABLE 2.—SYSTEMIC INSECTICIDAL ACTIVITY OF 2,2 DIMETHYL-8-CHROMANYL METHYLCARBAMATE

| Test insect | Percent kill at— | | |
|---|---|---|---|
| | 20 p.p.m. | 78 p.p.m. | Untreated |
| Mexican bean beetle | 83 | 100 | 0 |
| Southern armyworm | 10 | 0 | 0 |
| Two-spotted spider mite | 9 | 50 | 0 |
| Pea aphid | 100 | 100 | 0 |

The above results demonstrate excellent systemic activity.

Example 4.—Nematocidal activity

Nematode control was measured as follows: A nematode-infested soil was prepared by mixing about 1000 larvae of the root-knot nematode (*Meloidogyne incognita*) into one liter of sandy-loam soil. Into this infested soil was blended sufficient 2,2-dimethyl-8-chromanyl methylcarbamate, formulated as a 5% dust on attapulgite clay, to give concentrations of 100 p.p.m. and 25 p.p.m. These mixtures were held in the greenhouse in a moist condition for four days, then young tomato plants were planted in the soil and allowed to grow for five weeks. At this time the roots of the tomato plants were washed free of soil and the degree of infestation was evaluated in comparison with a plant grown in nematode-infested soil which had received no chemical treatment. Results, shown in Table 3, represent the average of two replicates.

TABLE 3.—NEMATOCIDAL ACTIVITY

| | Root-Knot Index [1] | Degree of nematode control |
|---|---|---|
| Concentration in p.p.m.: | | |
| 100 | 0 | Excellent. |
| 25 | 0 | Do. |
| Untreated | 4 | None. |

[1] Root-Knot Index:
4, severe knotting, equivalent to untreated plants.
3, heavy knotting, but less than untreated plants.
2, moderate knotting.
1, slight knotting.
0, no knotting, complete control.

Example 5.—Preparation and pesticidal properties of 8-chromanyl methylcarbamate

The starting material 8-hydroxychroman-4-one was prepared as follows: Catechol (450 g.) was dissolved in a hot solution of 220 g. of sodium hydroxide in about 200 ml. of water. To this was added dropwise 360 g. of 2-chloropropionic acid dissolved in a solution of 230 g. of potassium carbonate in a minimum quantity of water. The solution was heated at reflux for ten minutes, then cooled in an ice bath and adjusted to pH 2 with dilute hydrochloric acid. The aqueous solution was extracted with ether. The ether extract was washed, dried over magnesium sulfate, and concentrated, to yield 3-(o-hydroxyphenoxy)propionic acid as an oil. Approximately 900 ml. of acetic anhydride was added to this oil and the resulting solution heated at reflux overnight. Excess acetic anhydride was distilled, and the residue was washed with water. The organic layer was separated, and dried over magnesium sulfate to give crude 3-(o-acetoxyphenoxy)propionic acid, which was added to 1.5 l. of polyphosphoric acid at 45° and stirred at that temperature for two hours. The reaction mixture was cooled to room temperature, diluted with water, and extracted with ether. The ether extract was washed with aqueous sodium bicarbonate, dried, and concentrated to yield solid 8-hydroxychroman-4-one. The product, recrystallized from ethyl acetate, melted at 169–170°.

*Analysis*.—Calculated for $C_9H_8O_3$: C, 65.85; H, 4.91. Found: C, 65.74; H, 4.85.

Four grams of mercuric chloride was dissolved in 2.0 ml. of concentrated hydrochloric acid and 20 g. of washed zinc dust was added. This zinc amalgam, 5.0 g. of 8-hydroxychroman-4-one, and 30 ml. of concentrated hydrochloric acid were stirred at reflux for one hour. The mixture was cooled and extracted with ether, the ether layer was treated with sodium bicarbonate, dried over magnesium sulfate, and evaporated, to yield 5.0 g. of crude 8-chromanol, B.P. 61–64°/0.07 mm.

A mixture of 2.5 g. of 8-chromanol, 1.5 g. of methyl isocyanate, 10 ml. of ether, and 2 drops of triethylamine, after standing overnight, was diluted with pentane and filtered. Three grams of 8-chromanyl methylcarbamate were obtained, M.P. 158°. The structure of the product was confirmed by infrared spectra.

*Analysis*.—Calculated for $C_{11}H_{13}NO_3$: C, 63.76; H, 6.32; N, 6.76. Found: C, 63.77; H, 6.41; N, 6.82.

Following the test procedures described in Example 2, 8-chromanyl methylcarbamate exhibited at 1250 p.p.m. 95% kill of Mexican bean beetles, 100% kill of southern armyworms, 95% kill of pea aphids, 100% kill of milkweed bugs, 100% kill of plum curculios, and 86% kill of two-spotted mites.

Example 6.—Preparation and pesticidal properties of 2,2-diethyl-8-chromanyl methylcarbamate The starting material 3-ethyl-1-(o-hydroxyphenyl)-3-pentanol was prepared as described by L. I. Smith and P. M. Ruoff, J. Am. Chem. Soc. 62, 146 (1940). This product (101 g.) was dissolved in 150 ml. of glacial acetic acid and treated dropwise with 100 ml. of sulfuric acid. The mixture was heated under reflux for about two hours, then allowed to remain at room temperature overnight. The mixture was then poured over ice and water, and extracted with ether. The ether extractions were dried over magnesium sulfate, filtered, the ether was removed, and the resulting oil was distilled under reduced pressure, to give 77.5 g. of 2,2-diethylchroman, B.P. 57–60°/0.008 mm.

A solution composed of 150 ml. of ethyl ether and 137 ml. of a hexane solution containing 14 g. of n-butyllithium was placed in a flask and the system purged with nitrogen. To the solution was added 40 g. of 2,2-diethylchroman and the mixture was heated under reflux for twenty hours. The mixture was cooled in an ice-water bath and oxygen was bubbled into the mixture during stirring. When absorption of oxygen ceased, the mixture was acidified with cold aqueous sulfuric acid. The ether phase was separated, washed with water, dried over magnesium sulfate and the ether evaporated off. The residue was treated with decolorizing charcoal in dry ether, and the resultant ether solution distilled to yield, after recovery of unreacted 2,2-diethylchroman (B.P. 65–73°/0.1 mm.), 3.8 g. of 2,2-diethyl-8-chromanol, B.P. 78–80°/0.015 mm.

Three grams of 2,2-diethyl-8-chromanol, 3 drops of triethylamine, and 1.2 g. of methyl isocyanate were reacted as in Example 5, to yield 3.0 g. of 2,2-diethyl-8-chromanyl methylcarbamate, M.P. 68–70°.

*Analysis.*—Calc'd for $C_{15}H_{21}NO_3$: C, 68.42; H, 8.04. Found: C, 68.24; H, 7.91.

Following the test procedures of Example 2, this compound exhibited at 1250 p.p.m. 100% kill of Mexican bean beetles, 100% kill of pea aphids, 100% kill of milkweed bugs, and 70% kill of plum curculios.

Example 7.—Preparation and pesticidal properties of 6-ethyl-2,2-dimethyl-8-chromanyl methylcarbamate 6-ethyl-2,2-dimethylchroman was prepared as follows: A mixture of 122.2 g. of p-ethylphenol and 68.12 g. of isoprene was cooled to 0°, and hydrogen chloride gas passed into the mixture, with external cooling to maintain the temperature at about 6°. After thirty minutes, 100 ml. of glacial acetic acid was added. Hydrogen chloride addition was continued for two hours, during which time 25.4 g. hydrogen chloride was absorbed. After three days at room temperature, the mixture was distilled under reduced pressure to give 6-ethyl-2,2-dimethylchroman, B.P. 115–126°/9 mm. after redistillation.

*Analysis.*—Calculated for $C_{13}H_{18}O$: C, 82.06; H, 9.53. Found: C, 82.18; H, 9.74.

6-ethyl-2,2-dimethylchroman (50.3 g.), glacial acetic acid (300 ml.), and anhydrous sodium acetate (21.65 g.) were cooled in an ice bath while bromine (42.24 g.) was added dropwise. After stirring one hour, the mixture was poured into water and extracted with ether. The ether extract was dried over magnesium sulfate, filtered, and concentrated. Distillation yielded the product 8-bromo-6-ethyl-2,2-dimethylchroman, B.P. 101–5°/0.15 mm.

A solution of 59.0 g. of 8-bromo-6-ethyl-2,2-dimethylchroman in 200 ml. of ether was reacted with 14.0 g. of n-butyllithium, and then with oxygen, as in Example 6. Distillation gave 35 g. of 6-ethyl-2,2-dimethyl-8-chromanol, B.P. 55–122°/0.05 mm. Ten grams of 6-ethyl-2,2-dimethyl-8-chromanol, 5 g. of methyl isocyanate, and 5 drops of triethylamine in ethyl ether were reacted as in Example 6, to give 5.5 g. of 6-ethyl-2,2-dimethyl-8-chromanyl methylcarbamate, M.P. 114–115°.

*Analysis.*—Calculated for $C_{15}H_{21}NO_3$: C, 68.41; H, 8.04; N, 5.32. Found: C, 68.24; H, 7.97; N, 5.20.

This compound was evaluated for activity against houseflies (*Musca domestica* L.) as follows: 50 mg. of 6-ethyl-2,2-dimethyl-8-chromanyl methylcarbamate was dissolved in 70 ml. of acetone which was then diluted with sufficient water to make 100 ml. A group of 30–40 houseflies, immobilized under carbon dioxide, was placed on a moist filter paper held on a Buchner funnel attached to a vacuum source. Twenty-five ml. of the test solution was poured over the immobilized flies, this being sufficient volume that all were completely immersed. Vacuum was then applied to remove the test solution and the flies were transferred to holding cages lined with absorbent paper. Mortality counts made twenty-four hours after treatment showed 100% kill of houseflies.

Example 8.—Preparation and pesticidal properties of 2,2,5-trimethyl-8-chromanyl methylcarbamate The intermediate 5,6,7,8-tetrahydro-2-dimethylchroman-5-one was prepared by the method of V. I. Gunar and S. I. Zav'yalov, Izvest. Akad. Nauk SSSR 1960, 937; C.A. 54, 24700f (1960). To a solution of 50 g. of this compound in 100 ml. of ether was added, under nitrogen atmosphere, 130 ml. of a 3 molar solution of methylmagnesium bromide solution in ethyl ether. When addition was complete, the mixture was heated under reflux for two hours, 200 ml. of cold 10% sulfuric acid was added, and reflux continued for one hour. The ether layer was separated, dried, and concentrated to yield crude 7,8-dihydro-2,2,5-trimethylchroman. This crude product was added to 90 g. of chloranil in 600 ml. of benzene and the mixture heated under reflux for 16 hours. The reaction mixture was cooled and filtered. The filtrate was washed, dried, and concentrated to yield a brown oil, which was purified by chromatographing through an alumina column using pentane as the eluant, to give purified 2,2,5-trimethylchroman, B.P. 60–61°/0.1 mm.

2,2,5-trimethylchroman (16 g.) was reacted with n-butyl-lithium (6.4 g.), and the lithiated product treated with oxygen, according to the procedure described in Example 6, to give 1.5 g. of 2,2,5-trimethyl-8-chromanol. This product was reacted with methyl isocyanate as in Example 6, to yield 1.2 g. of 2,2,5-trimethyl-8-chromanyl methylcarbamate, M.P. 132.5–133.5° on recrystallization from hexane.

*Analysis.*—Calculated for $C_{14}H_{19}NO_3$: C, 67.44; H, 7.68; N, 5.62. Found: C, 67.16; H, 7.58; N, 5.55.

This compound was tested for insecticidal activity by the procedure set forth in Example 2. At 1250 p.p.m., 80% kill of Mexican bean beetles, 100% kill of milkweed bugs, 100% kill of plum curculios, and 100% kill of two-spotted mites was obtained.

Example 9.—Preparation and pesticidal properties of 5-chloro-2,2-dimethyl-8-chromanyl methylcarbamate 2,2-dimethyl-8-chromanol was chlorinated as follows: To a stirred solution of 18 g. of 2,2-dimethyl-8-chromanol in 50 ml. of chloroform was added dropwise 13.5 g. of sulfuryl chloride. Gas evolution began immediately. The mixture was stirred overnight at room temperature. The solvent was removed by evaporation and the residue distilled through a spinning band column to yield 2.2 g. of 5-chloro-2,2-dimethyl-8-chromanol, B.P. 132–145°/0.05 mm.

*Analysis.*—Calculated for $C_{11}H_{13}ClO_2$: C, 62.11; H, 6.15. Found: C, 61.66; H, 6.30.

5-chloro-2,2-dimethyl-8-chromanol (8.5 g.) was reacted with 2.4 g. of methyl isocyanate by the procedure described in Example 1 to give 5.3 g. of 5-chloro-2,2-dimethyl-8-chromanyl methylcarbamate, M.P. 128–129°.

*Analysis.*—Calculated for $C_{13}H_{16}ClNO_3$: C, 57.88; H, 5.98; N, 5.19. Found: C, 57.97; H, 5.83; N, 5.40.

Following the procedure described in Example 2, this compound gave, at 1250 p.p.m., 90% kill of Mexican bean beetles, 80% kill of southern armyworms, 100% kill of pea aphids, 100% kill of milkweed bugs, and 100% kill of plum curculios.

Example 10.—Preparation and pesticidal properties of 2,2-dipropyl-8-chromanyl methylcarbamate Following the procedure set forth in Example 6, propylmagnesium bromide was reacted with chroman-2-one, to form 1-(o-hydroxyphenyl)-3-propyl-3-hexanol, M.P. 64–66°. By action of acetic acid in the presence of sulfuric acid, this product was cyclized to give 2,2-dipropylchroman, B.P. 71–74°/0.007 mm., which was converted by lithiation and oxidation, also as in Example 6, to 2,2-dipropyl-8-chromanol, B.P. 95°/0.25 mm. Reaction of this chromanol with methyl isocyanate according to the procedure of Example 6 gave 2,2-dipropyl-8-chromanyl methylcarbamate, M.P. 99–100°.

Analysis.—Calculated for $C_{17}H_{25}NO_3$: C, 70.07; H, 8.65; N, 4.81. Found: C, 70.36; H, 8.78; N, 4.83.

Following the procedures of Example 2, this compound gave 100% kill of Mexican bean beetles, at 1250 p.p.m.

Example 11.—Preparation and pesticidal properties of 6-sec-butyl-2,2-dimethyl-8-chromanyl methylcarbamate To a stirred solution of 500 g. of isoprene and 200 g. of 4-sec-butylphenol in 1500 ml. of glacial acetic acid was added 30 g. of anhydrous zinc chloride and 30 drops of concentrated sulfuric acid. After one hour, an additional 20 drops of sulfuric acid was added followed by another 20 drops one hour later. Stirring at room temperature was continued for four days. The mixture was then poured into one liter of water, the organic layer was separated and washed, dried, and concentrated on an evaporator. Distillation of the residue over the range of 123–203°/10 mm. gave 134 g. of crude 6-sec-butyl-2,2-dimethylchroman, which on fractional redistillation boiled at 141–144°/13 mm.

Analysis.—Calculated for $C_{15}H_{22}O$: C, 82.52; H, 10.16. Found: C, 82.67; H, 10.02.

This product was hydroxylated by treatment with n-butyl-lithium and with oxygen, as in Example 6, to give 6-sec-butyl-2,2-dimethyl-8-chromanol, B.P. 91–95°/0.2 mm. This chromanol was reacted with methyl isocyanate by the procedure of Example 1 to give 6-sec-butyl-2,2-dimethyl-8-chromanyl methylcarbamate, M.P. 169–170°.

Analysis.—Calculated for $C_{17}H_{25}NO_3$: C, 70.07; H, 8.65; N, 4.81. Found: C, 70.21; H, 8.50; N, 5.03.

Following the test procedure of Example 2, this compound at 1250 p.p.m. gave 92% kill of houseflies.

Example 12.—Preparation and pesticidal properties of 2,2,7-trimethyl-8-chromanyl methylcarbamate 2,2,7-trimethylchroman was prepared as follows: A dry suspension of sodium hydride (88.8 g.) in 400 ml. benzene was purged with nitrogen and to it was slowly added 209.1 g. of m-cresol in 500 ml. benzene. The mixture was stirred at room temperature for two hours. The suspension of sodium salt was cooled to 5° and to it was added dropwise 219.7 g. of 1-chloro-3-methyl-2-butene while the temperature was maintained at about 5°. After two hours at this temperature, stirring was continued three days without external cooling. The mixture was then heated under reflux for one hour, cooled to room temperature, and acidified with dilute sulfuric acid. The organic layer was separated and the benzene removed by evaporation, to yield 354.5 g. of dark red oil. To this crude mixture of 2-(3-methyl-2-buten-1-yl)-3- and -5-methylphenols was added dropwise 7 ml. of concentrated sulfuric acid. The temperature rapidly increased to 100°, then began to decrease. At room temperature, 500 ml. of benzene was added. The benzene solution was washed with dilute sodium bicarbonate solution and with water, dried, and the benzene was evaporated. The residue was distilled under reduced pressure to give 152.1 g. of a mixture of 2,2,5- and 2,2,7-trimethylchromans, B.P. 99–124°/15 mm. This mixture was separated using a gas chromatograph. The desired 2,2,7-trimethylchroman was identified by nuclear magnetic resonance.

2,2,7-trimethylchroman was treated with n-butyllitrium and oxygen as in Example 6, to give 2,2,7-trimethyl-8-chromanol, B.P. 79°/0.03 mm. This chromanol was reacted with methyl isocyanate as in Example 1, to give 2,2,7-trimethyl-8-chromanyl methylcarbamate, M.P. 115–116° from hexane.

Analysis.—Calculated for $C_{14}H_{19}NO_3$: C, 67.44; H, 7.68. Found: C, 67.59; H, 7.44.

Following the test procedure of Example 2, this product exhibited at 1250 p.p.m. 95% kill of milkweed bugs and 45% kill of plum curculios.

Example 13.—Preparation and pesticidal properties of 2,2-dimethyl-8-chromanyl dimethylcarbamate 2,2-dimethyl-8-chromanol (26.7 g.), prepared as in Example 1, was added dropwise at room temperature to a solution of sodium methoxide, prepared by dissolving 3.45 g. of sodium metal in 50 ml. of methanol. The mixture was heated at 50° for one hour and the methanol removed by distillation under reduced pressure. The sticky solid which remained was triturated with hexane and filtered to give a white powder. To a solution of 13.5 g. of this sodium salt in 75 ml. of dioxane was added dropwise 7.5 g. of dimethylcarbamoyl chloride. After the exothermic reaction subsided, the slurry was heated at 75° for two hours. The slurry was concentrated under reduced pressure and the residue diluted with 100 ml. of ether. The ether solution was washed with water, dried, and distilled to yield 7.1 g. of 2,2-dimethyl-8-chromanyl dimethyl-carbamate, B.P. 101–102°/0.01 mm.

Analysis.—Calculated for $C_{14}H_{19}NO_3$: C, 67.45; H, 7.68; N, 5.62. Found: C, 67.57; H, 7.50; N, 5.90.

When tested at 1250 p.p.m. by the procedure of Example 2, this compound gave 80% kill of Mexican bean beetles, 100% kill of pea aphids, 100% kill of milkweed bugs, and 100% kill of plum curculios.

Example 14.—Preparation and pesticidal properties of 2,2-dimethyl-8-chromanyl propylcarbamate To a sodlution of 11.75 g. of 2,2-dimethyl-8-chromanol and 0.2 g. of 1,4-diazabicyclo(2.2.2)octane in 75 ml. of ethyl ether was added dropwise with stirring, 6.0 g. of propyl isocyanate. The mixture was stirred at room temperature overnight. The ether and excess propyl isocyanate was removed by distillation and the residue diluted with petroleum ether. The solid was collected to obtain 7.0 g. of 2,2-dimethyl-8-chromanyl propylcarbamate, M.P. 71–72° (from hexane).

When tested by the procedure of Example 2, this compound at 1250 p.p.m. gave 100% kill of Mexican bean beetles, 100% kill of pea aphids, 100% kill of milkweed bugs, and 47% kill of two-spotted mites.

Example 15.—Preparation and pesticidal properties of 2,2-dimethyl-8-chromanyl allylcarbamate 2,2-dimethyl-8-chromanol (16.2 g.) was reacted with 6.0 g. of allyl isocyanate in 50 ml. of benzene, according to the procedure of Example 14, to give, after recrystallization from hexane, 8.5 g. of 2,2-dimethyl-8-chromanyl allylcarbamate, M.P. 70–71°.

Analysis.—Calculated for $C_{15}H_{19}NO_3$: C, 68.94; H, 7.33; N, 5.36. Found: C, 68.89; H, 7.04; N, 5.47.

When tested according to the procedure of Example 2, this compound at 1250 p.p.m. gave 100% kill of Mexican bean beetles, 100% kill of southern armyworms, 100% kill of pea aphids, 100% kill of milkweed bugs, 90% kill of plum curculios, and 87% kill of two-spotted mites.

Example 16.—Preparation and pesticidal properties of 2,2-dimethyl-8-chromanyl propargylcarbamate To a solution of 25 g. of 2,2-dimethyl-8-chromanol in 100 ml. of benzene at 0° was added 11 ml. of liquid phosgene. While the temperature was maintained at 4–7°, 14.2 g. of triethylamine was added dropwise. The mixture was stirred for one hour at 5°, then for two hours at 25°. The slurry was diluted with 150 ml. cold water. The benzene layer was separated, dried, and concentrated to leave 32.5 g. of yellow oily 2,2-dimethyl-8-chromanyl chloroformate which was used without further purification. A solution of 16.2 g. of this crude chloroformate in 50 ml. benzene was added dropwise to a stirred solution of 3.7 g. propargylamine and 6.8 g. triethylamine in 25 ml. benzene. The slurry was stirred for three hours at 50–60°, then cooled to 20° and filtered. The filtrate was washed with cold water, dried, and concentrated by evaporation. The residual oil was diluted with hexane and the white solid isolated by filtration to yield 8.0 g. 2,2-dimethyl-8-chromanyl propargylcarbamate, which on recrystallization from hexane gave 7.0 g. of platelets, M.P. 95–95.5°.

Analysis.—Calculated for $C_{15}H_{17}NO_3$: C, 69.48; H, 6.61; N, 5.40. Found: C, 69.68; H, 6.74; N, 5.48.

When tested according to the method of Example 2, this compound at 1250 p.p.m. gave 100% kill of Mexican bean beetles, 100% kill of southern armyworms, 100% kill of pea aphids, 100% kill of milkweed bugs, and 45% kill of plum curculios.

Other compounds of this class of insecticidal chromanyl carbamates may be prepared by adaptation of the synthetic procedures illustrated herein and by related procedures. The intermediate 8-chromanols may be converted to the carbamates by standard procedures, such as reaction with the appropriate isocyanate, or with phosgene to form the chloroformate or the bis(carbonate), which is then reacted with the appropriate amine to form the carbamate; or alternatively by the transesterification of phenyl N-mono- or N,N-disubstituted carbamates with the appropriate 8-chromanol. The intermediate 8-chromanols, either unsubstituted or substituted in the 2-, 5-, 6-, or 7-position, may be prepared by a variety of methods, the desired product, of course, determining the specific starting material and methods to be employed. For example, the desired chroman, unsubstituted or substituted, may be lithiated as described by Hallet and Huls (op. cit.), to give the 8-lithium compound which is oxidized and then hydrolyzed to the 8-chromanol. Bromination of the chromans also proceeds to the 8-bromo- compound, which may be converted to the 8-hydroxy-compound by several processes, such as (a) hydrolysis with alkali in a high-boiling protonic solvent such as ethylene glycol in the presence of a copper catalyst; (b) lithiation of the 8-bromo-compound, either directly with metallic lithium or by exchange with an alkyllithium such as n-butyllithium, followed by oxygenation and hydrolysis; (c) conversion to the corresponding Grignard reagent, and oxygenation of the Grignard, as described by Porter and Steel, J. Am. Chem. Soc. 42, 2650 (1920).

Nitration of chromans also gives the 8-nitro compound, which is readily reduced to the 8-amino compound. Diazotization of 8-aminochromans and subsequent hydrolysis of the diazonium salt gives the desired 8-chromanol. Other procedures may be used, such as the hydrolysis of 8-methoxychromans by an ether-cleaving acid such as hydroiodic acid, to give the corresponding 8-chromanols.

The appropriately substituted chromans may be prepared by a variety of procedures, starting with intermediates in which either both rings are present, or only the aromatic ring is present, or no aromatic ring is present. Thus, a hydroxyphenylalkanol is formed by reaction of an appropriately substituted chroman-2-one with an alkyl Grignard reagent (Smith and Ruoff, J. Am. Chem. Soc. 62, 145 (1940)); cyclization of this alkanol in the presence of acid gives a 2,2-dialkylchroman in which the alkyl group corresponds to that of the Grignard reagent. Reaction of the appropriately substituted phenol with isoprene in the presence of acid catalysts, such as zinc chloride or acetic acid-sulfuric acid mixtures, gives the corresponding substituted 2,2-dimethylchroman, as described by Claisen, German Patent 374,142; m-substituted phenols gives mixtures of the 5- and 7-substituted 2,2-dimethylchromans. Similarly, the aluminum salt of the appropriate substituted phenol reacts with isoprene to give the corresponding substituted 2,2-dimethylchroman (British Patent 906,483). Other procedures may also be adapted to the synthesis of this class of compounds, such as that exemplified by condensation of the sodium salt of cyclohexane-1,3-dione with 1-chloro-3-methyl-2-butene to give 2-(3-methyl-2-buten-1-yl)-cyclohexane - 1,3 - dione, which on treatment with acid cyclizes to 5,6,7,8-tetrahydro-2,2-dimethylchroman-5-one; this chromanone reacts with an alkyl Grignard reagent to give an intermediate 5-chromanol which in the presence of acid, such as sulfuric acid, dehydrates and aromatizes to give a 5-alkyl-2,2-dimethylchroman.

The foregoing reactions are of course not limited to the specific compounds mentioned. Through the use of the appropriate starting materials and reagents, 8-chromanyl carbamates with the desired substituent or substituents in the aromatic and/or heterocyclic ring may be obtained.

The compounds of this invention are toxic to a variety of crop and household pests, in addition to the typical pests exemplified above. Like most agricultural chemicals, they are not usually applied full strength, but are generally incorporated with the adjuvants and carries normally employed for facilitating dispersion of active ingredients for agricultural chemical applications, recognizing the accepted fact that the formulation and mode of application may affect the activity of a material. The toxicants of this invention may be applied as sprays, dusts, or granules. They may be formulated as granules of large particle size, as powdery dusts, as wettable powders, as emulsifiable concentrates, as solutions, or as any of several other known types of formulations, depending on the desired mode of application.

Wettable powders are in the form of finely divided particles which disperse readily in water or other dispersant. These compositions normally contain from 5–80% toxicant and the rest inert material which includes dispersing agents, emulsifying agents, and wetting agents. The powder may be applied to the soil as a dry dust or preferably as a suspension in water. Typical carriers include fuller's earth, kaolin clays, silicas, and other highly absorbent, readily wet, inorganic diluents. Typical wetting, dispersing, or emulsifying agents used in agricultural formulations include, for example, the alkyl and alkylaryl sulfonates and sulfates and their sodium salts; alkylamide sulfonates, including fatty methyl taurides; alkylaryl polyether alcohols, sulfated higher alcohols, and polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from one percent to fifteen percent by weight of the pesticidal composition. A typical formulation for use herein is as follows: 25.0% of the desired 8-chromanyl carbamate, 72.0% attapulgite clay, 1.5% sodium lignosulfonate, and 1.5% sodium alkylnapthalene sulfonate.

Dusts are freely flowing admixtures of the active ingredient with finely divided solids such as talc, natural clays, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about fifty microns. A typical dust formulation useful herein contains 5.0% of the 8-bromanyl carbamate and 95.0% talc.

Useful liquid concentrates include the emulsifiable concentrates, which are homogeneous liquid or paste compositions which are readily dispersed in water or other dispersant, and may consist entirely of the toxicant with a liquid or solid emulsifying agent, or may also contain a liquid carrier, such as xylene, heavy aromatic naphthas, isophorone, and other non-volatile organic solvents. For application these concentrates are dispersed in water or other liquid carrier, and normally applied as a spray to the area to be treated. The percentages by weight of the toxicant may vary according to the manner in which the composition is to be applied, but in general comprises 0.5 to 95% of active ingredient by weight of the pesticidal composition.

Other useful formulations for insecticidal or nematocidal applications include simple solutions of the active ingredient in a dispersant in which it is completely soluble at the desired concentration, such as acetone, alkylated naphthalenes, xylene, or other organic solvents. Granular formulations, wherein the toxicant is carried on relatively coarse particles, are of particular utility for aerial distribution or for penetration of cover crop canopy. Baits, prepared by mixing solid or liquid concentrates of the toxicant with a suitable food, such as a mixture of cornmeal and sugar, are useful formulations for control of insect pests. Pressurized sprays, typically aerosols wherein the active ingredient is dispersed in finely divided form as a result of vaporization of a low-boiling dispersant solvent carrier, such as the Freons, may also be used. All of these techniques for formulating and applying the active ingredient are well known in the art.

The pesticidal compositions may be formulated and applied with other active ingredients, including other nematocides, insecticides, fungicides, bactericides, plant growth regulators, fertilizers, etc. In applying the chemical an effective amount and concentration of the 8-chromanyl carbamate is of course employed.

It is apparent that various modifications may be made in the formulation and application of the novel compounds of this invention, without departing from the inventive concepts herein, as defined in the following claims.

I claim:
1. A compound of the formula:

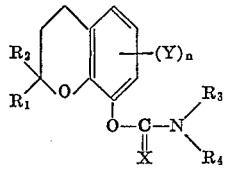

wherein $R_1$ and $R_2$ are each selected from the group consisting of hydrogen and alkyl and alkenyl groups of one to about three carbon atoms; $R_3$ and $R_4$ are each selected from the group consisting of hydrogen and alkyl, alkenyl, and alkynyl groups of one to about three carbon atoms; Y represents one or more substituents selected from the group consisting of hydrogen, lower alkyl and lower alkenyl groups, halogen, nitro, amino, and cyano groups; $n$ is an integer of 1 to 3; and X is selected from the group consisting of oxygen and sulfur.

2. A compound of the formula:

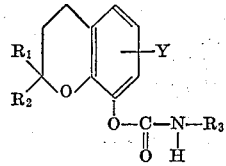

wherein $R_1$ and $R_2$ are each selected from the group consisting of hydrogen and methyl; $R_3$ is selected from the group consisting of hydrogen and alkyl, alkenyl, and alkynyl radicals of one to three carbon atoms; and Y represents monosubstitution in the 5- or 6-position and is selected from the group consisting of hydrogen, chlorine, and lower alkyl.

3. A compound of claim 1, of the formula 2,2-dimethyl-8-chromanyl methylcarbamate.

4. A compound of claim 1, of the formula 2,2-dimethyl-6-ethyl-8-chromanyl methylcarbamate.

5. A compound of claim 1, of the formula 2,2-diethyl-8-chromanyl methylcarbamate.

6. A compound of claim 1, of the formula 2,2,5-trimethyl-8-chromanyl methylcarbamate.

7. A compound of claim 1, of the formula 8-chromanyl methylcarbamate.

References Cited
UNITED STATES PATENTS

| | | | |
|---|---|---|---|
| 2,939,851 | 6/1960 | Orchin | 260—482 XR |
| 3,084,182 | 4/1963 | McElroy | 260—482 XR |
| 3,122,551 | 2/1964 | Zaugg et al. | 260—345.2 XR |
| 3,344,170 | 9/1967 | Strycker | 260—482 |

HENRY R. JILES, Primary Examiner

JOHN M. FORD, Assistant Examiner

U.S. Cl. X.R.

424—283